INVENTORS
ALLAN I. BEST
WILLIAM A. FARNBACH
JEFFREY H. SMITH

BY *A. C. Smith*

ATTORNEY

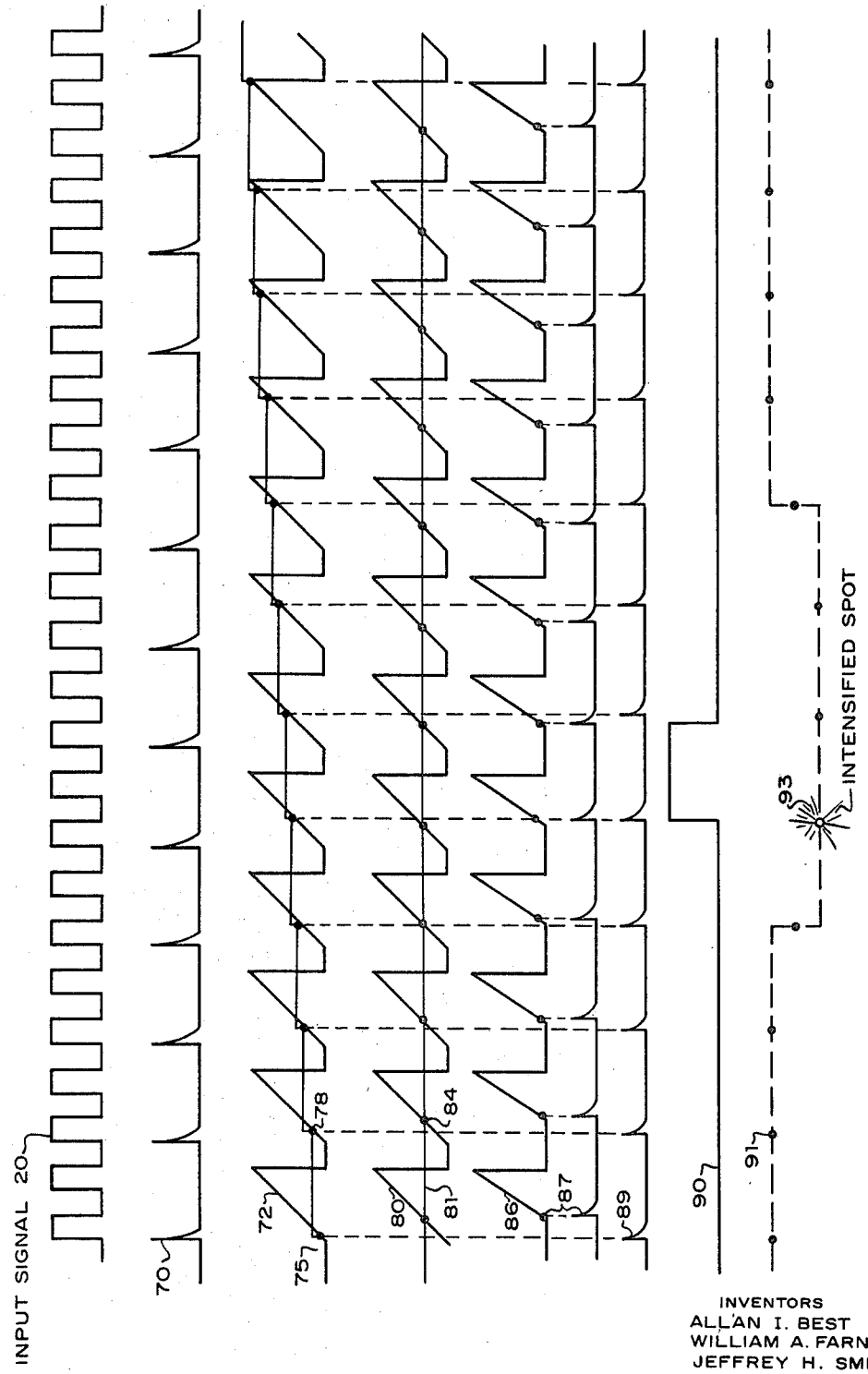

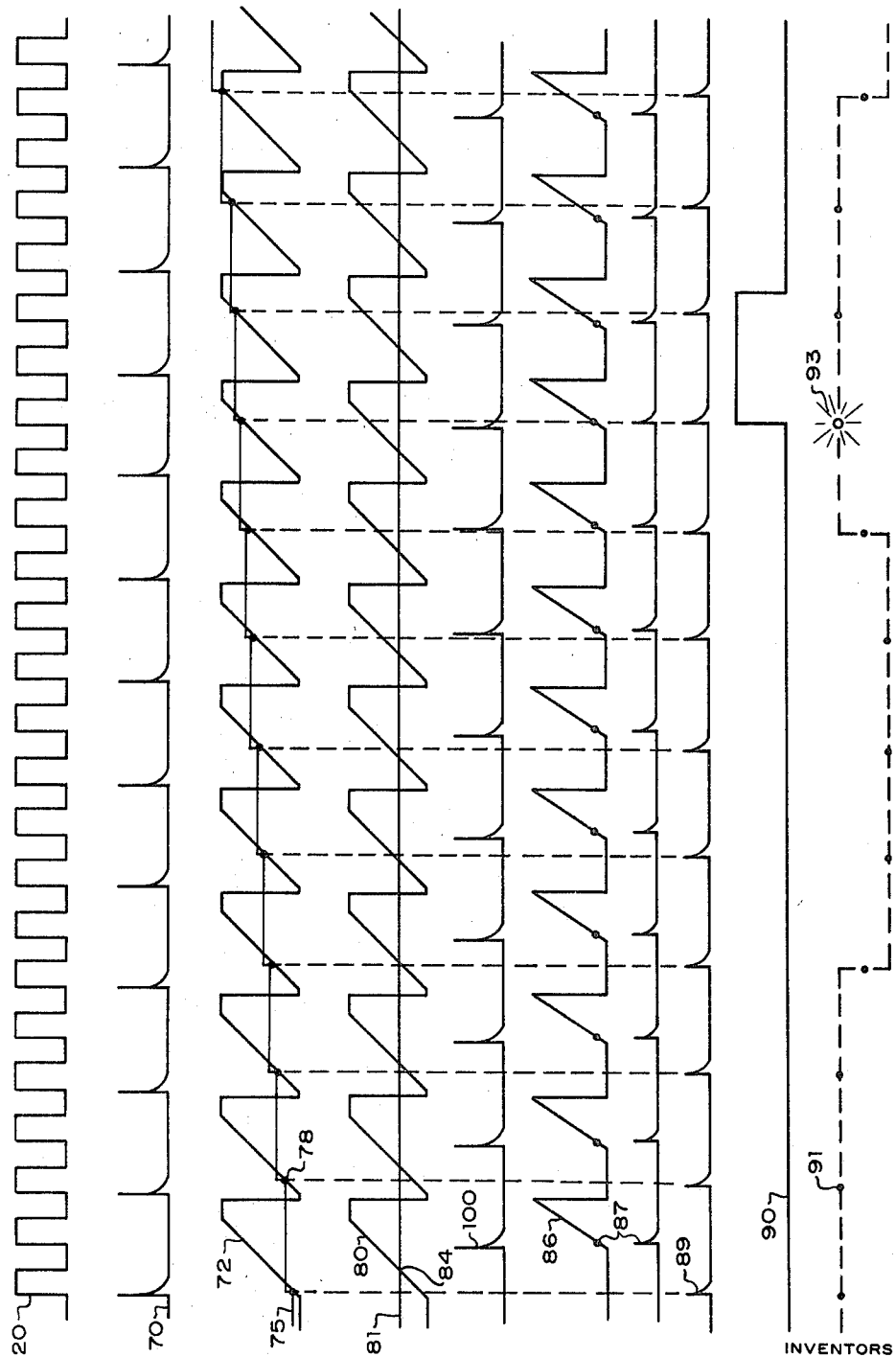
Figure 3  DELAYING MODE – ARMED

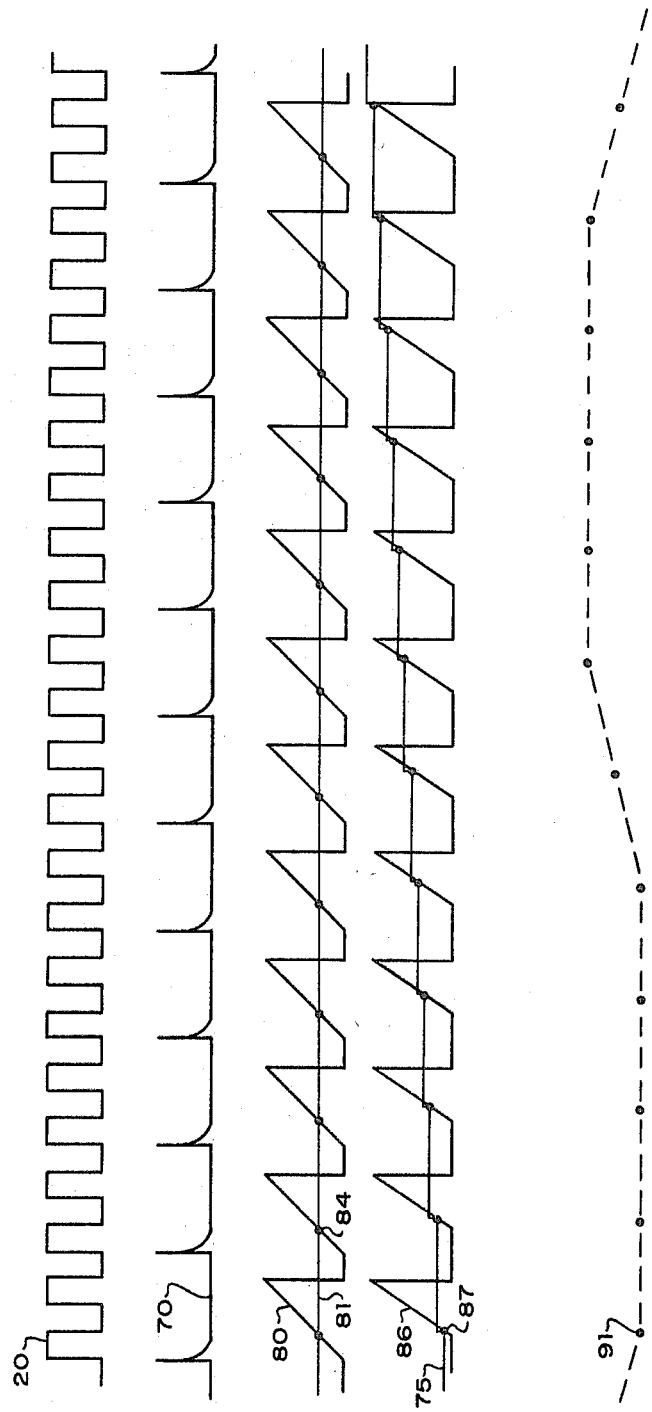
Figure 4 MAIN DELAYED MODE — TRIGGERED

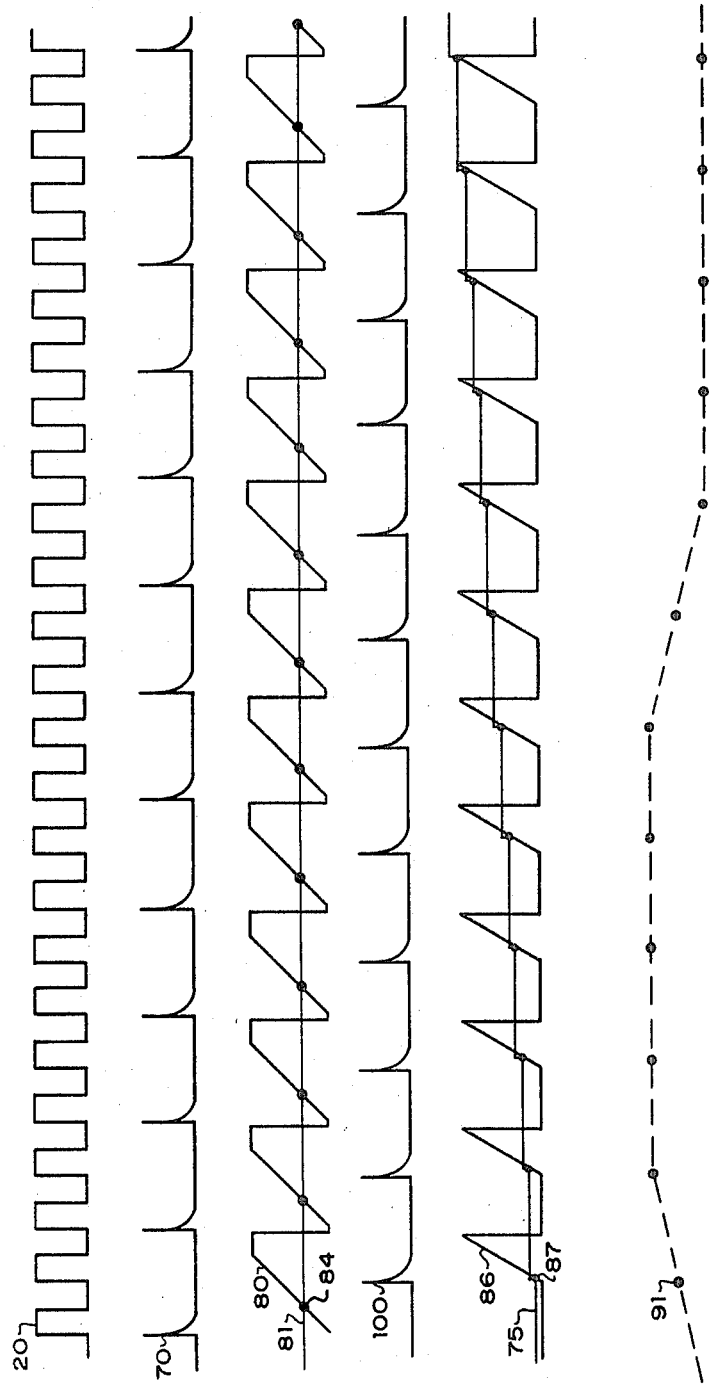
Figure 5 MAIN DELAYED - ARMED MODE

United States Patent Office 3,423,629
Patented Jan. 21, 1969

3,423,629
SAMPLING OSCILLOSCOPE SWEEP CIRCUIT
Allan I. Best, William A. Farnbach, and Jeffrey H. Smith,
Colorado Springs, Colo., assignors to Hewlett-Packard
Company, Palo Alto, Calif., a corporation of California
Filed July 10, 1967, Ser. No. 652,077
U.S. Cl. 315—22                                  7 Claims
Int. Cl. H01j 29/70

ABSTRACT OF THE DISCLOSURE

A sweep circuit for a multi-mode sampling oscilloscope having manual selection and identification of an event in the waveform of a recurring input signal during a slow time scale display mode and automatic expansion of the signal waveform about the selected event during a fast time scale display mode. Identification of an event during the slow time scale is by intensification of the display, either a predetermined time after the sweep has begun or upon the occurrence of a selected event following the predetermined time. Expansion of the waveform during the fast time scale occurs either at the end of a predetermined delay period or upon the happening of a selected event following the predetermined delay period.

Background of the invention

Certain sampling type oscilloscopes enable a recurring signal waveform to be displayed on an expanded time scale by sweeping a portion of the signal very rapidly across the cathode-ray display screen.

However, this requires that the expanded displayed signal be shifted selectively on the display screen to locate and display a particular event. One disadvantage encountered in sampling type oscilloscopes of this type is that it is difficult to identify the event which was selected during slow time scale display when the signal is subsequently expanded and displayed on a fast time scale. Also, any jitter on the displayed signal is magnified on the expanded or fast scale sweep, thus making it difficult to examine an expanded event closely.

Summary of the invention

Accordingly, in the illustrated embodiment of the present invention, a slow sweep is generated in synchronism with the input signal for providing accurately controlled time intervals after which a second sweep is produced to provide the time base for the cathode-ray tube display. This delayed sweep feature permits any portion of a complex signal or pulse train to be examined in detail on very fast time scales. In addition, the faster sweep may be started at the end of the delay interval generated by the slower sweep, either automatically (delayed trigger mode) or externally by the input signal (delayed armed mode). In the delayed trigger mode the faster sweep is immediately triggered automatically at the end of the delay interval, thereby permitting accurate measurements of any rate jitter associated with input signal. In the delayed armed mode the faster sweep is armed at the end of the delay interval thereby permitting the input signal to trigger the faster sweep. Thus, any jitter associated with the input signal is effectively eliminated from the display.

Description of the drawing

FIGURES 2, 3, 4, and 5 are graphs of signal waveforms in the circuit of FIGURE 1 operating, respectively, in the Delaying Sweep-Triggered mode, Delaying Sweep-Armed mode, the Delayed Triggered Sweep mode, and Delayed Armed Sweep mode.

Description of the preferred embodiment

Figure 1:
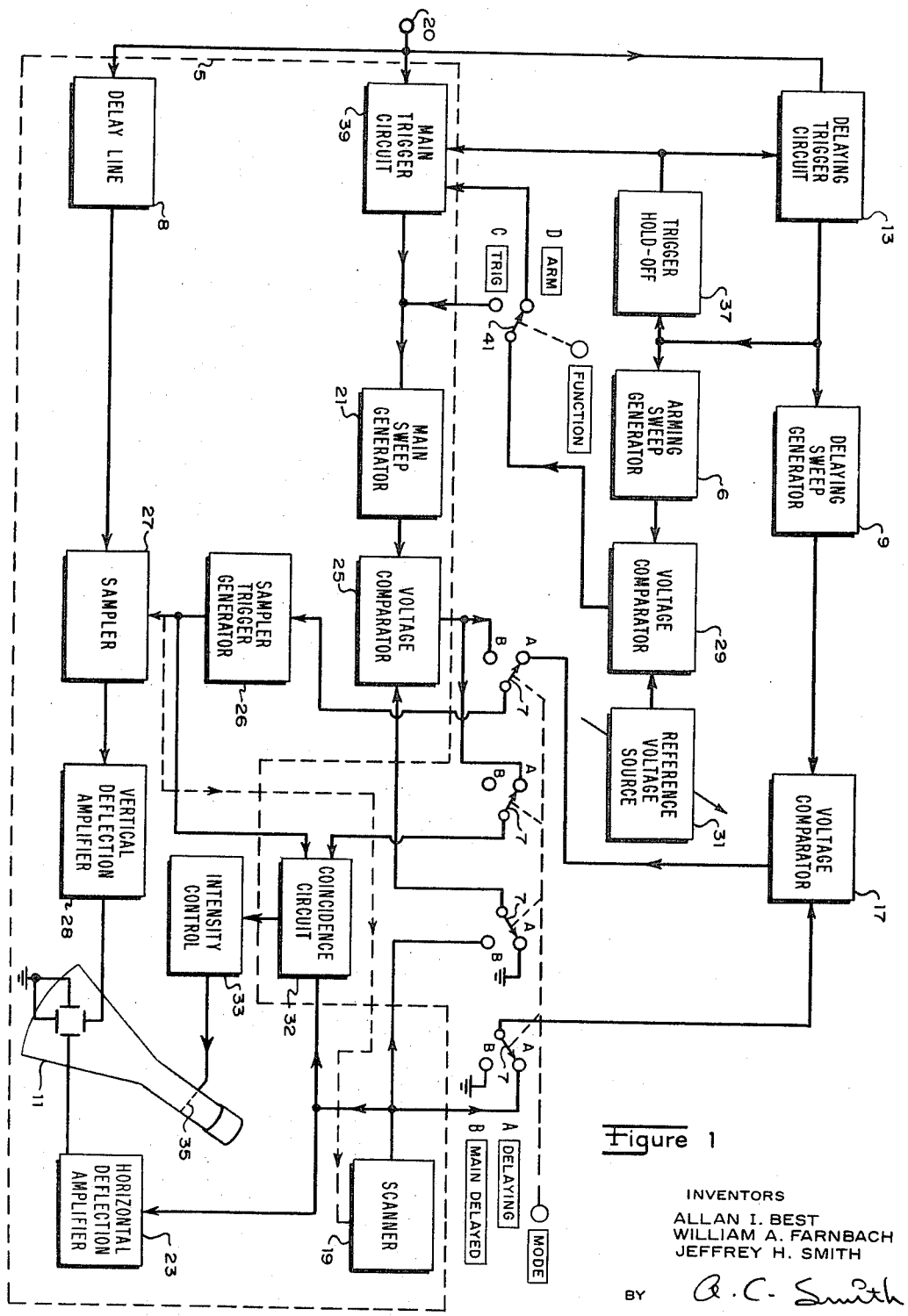
FIGURE 1 is a schematic diagram of the circuit of the present invention.

Referring now to the circuit diagram of FIGURE 1, the circuit blocks and signal paths which comprise a conventional sampling oscilloscope are designated generally as 5. Switch 7 and the associated additional circuit blocks and signal paths select circuit operation either in the delaying sweep mode or in the main sweep delayed mode and switch 41 and its associated circuit blocks and signal paths select circuit operation either in the automatic sweep trigger function or in the armed sweep function. The input signal at terminal 20 is applied through delay line 8 to the sampler 27 where sample pulses of the input signal are produced at selected instants, which sample pulses are then applied through the vertical deflection circuitry 28 to the vertical deflection electrodes of cathode-ray display tube 11. Delay line 8 enables a sweep to be initiated before the input signal (or samples thereof) appears on the vertical deflection electrodes of the CRT 11. The selected instants at which sampler 27 samples the input signal are thus determined by the circuitry of the present invention operating in any one of the modes and functions described herein.

Delaying sweep-triggered operating mode

Referring to the circuit diagram of FIGURE 1 and to the timing graph of FIGURE 2, switch 7 is set to position A as shown to establish the horizontal axis time scale on the cathode ray display tube 11 as follows: the delaying sweep generator 9 and the arming sweep generator 6 are triggered by the delaying trigger circuit 13 (waveform 70) and provide identical slow sweeps 72 and 80 in response to the input signal at terminal 20. The function of the arming sweep generator will be described later. Voltage comparator 17 receives the signal 72 from delaying sweep generator 9 on one input and receives on the other input a scanning signal 75, normally a staircase waveform, derived from the scanner 19. When the voltage level of these two signals are equal, voltage comparator 17 triggers (78) sample trigger generator 26 which, in turn, triggers the sampler 27 and provides a trigger 89 to coincidence circuit 32. The sampler 27 is rendered momentarily operative by the output of generator 26 to produce a narrow pulse having an amplitude related to the amplitude of the input signal applied thereto through delay line 8 from terminal 20 at the instant the sampler 27 is triggered into conduction. Samplers of this type are shown and described in the literature (see U.S. Patents 3,191,065, 3,191,072, issued on June 22, 1965, and U.S. Patent 3,011,129 issued on Nov. 28, 1961). The output of sampler 27 is connected to the vertical deflection circuit 28 which applies deflection signals to the vertical deflection plates of CRT 11. The horizontal deflection circuit 23 applies a deflection signal such as a staircase waveform derived from scanner 19 to the horizontal deflection plates of CRT 11 to produce the desired sample presentation 91 of the input signal 20 in FIGURES 2, 3, 4 and 5. Scanner 19 may be of conventional design in which the output amplitude increases by a fixed increment for each sample taken.

The arming sweep generator 6, which is identical to the delaying sweep generator 9, applies a sweep signal 80 to one input of the voltage comparator 29. The other input of this comparator 29 is connected to receive a variable reference voltage 81 from source 31. When these voltages are equal comparator 29 provides a trigger 84 which will either arm the main trigger circuit 39 or start the main sweep generator 21, depending upon the position of the function switch 41.

Consider the operating mode when switch 41 is set to position C. Main sweep generator 21 is thus started by the trigger 84 from comparator 29 and provides a fast or expanded sweep 86 at one input of voltage comparator 25, the other input of which is connected to a reference voltage, say, ground. When these two input voltages are equal, voltage comparator 25 applies a bias signal 87 to coincidence circuit 32. The coincidence circuit 32 receives two signals; (1) the bias signal 87 from voltage comparator 25, just mentioned and (2) a trigger 89 from the sampler trigger generator 26, mentioned earlier. The coincidence circuit 32 activates the intensity control 33 only when these two signals occur simultaneously or when the trigger from sampler trigger generator 26 occurs after the bias signal from voltage comparator 25. The coincidence circuit 32 is also arranged so that after it has been activated once, it cannot be reactivated until the signal from scanner 19 has returned the electron beam display to the left hand edge of the CRT display screen 11. Thus, coincidence circuit 32 responds to applied signals, as described above, and triggers intensity control 33 which momentarily alters the voltage 90 on the intensity control grid 35 of the CRT 11, thereby intensifying a spot 93 at a selected event on the displayed waveform of the input signal. The position in the displayed waveform of this bright spot 93, occurring in response to the output of coincidence circuit 32, is determined by the setting of adjustable voltage source 31. The position of this bright spot 93 represents the time between the start of the delaying time scale sweep (which is displayed and which is synchronized to the input signal at terminal 20) and the time that the first sample will be taken of a selected event when the selected event is displayed on the fast or expanded sweep in the main delayed mode. Further, the delay between the start of the arming and delaying sweep generators 6 and 9 and a selected event as indicated by the intensified spot on the displayed input signal 20 is a function of the slope of the main sweep generator 21. The insertion of this variable delay or start up time determined by the main sweep generator 21 is necessary to make the signal path delays in the delaying sweep mode of operation identical to the signal path delays in the main sweep delayed mode of operation later described. This insures that the event selected in the delaying mode will be the event displayed in the main delayed mode of operation. Since the coincidence circuit 32 cannot be re activated until the signal from scanner 19 returns the electron beam display to the left hand edge of the CRT, the intensifying signal 9 and the bright spot 93 occur only once for each horizontal sweep (once per scan). In the delaying sweep triggered mode the bright spot 93 may thus be moved smoothly along the displayed waveform by varying the reference voltage source 31, which may therefore be calibrated to provide a readout directly in delay time.

The trigger hold-off 37 prevents the delaying sweep trigger circuit 13 from starting the delaying sweep generator 9 and the arming sweep generator 6 for a time equal to the length of the delaying sweep plus the length of the main sweep plus an additional interval of time to allow full recovery of all circuits. Trigger hold-off 37 also resets the sweep generators 6, 9, and 21. The waveform of the input signal at terminal 20 is thus displayed on an unexpanded or slow time scale and the start or any portion of the diseplayed waveform may be identified by an intensified spot and thereby selected for display on an expanded time scale.

*Delaying sweep-armed mode*

Referring now to FIGURES 1 and 3, the operation of the present circuit in this mode is similar to its operation in the mode previously described, except that the main sweep generator 21 is started differently. In this mode of operation switch 41 is set to position D so that the output trigger 84 of voltage comparator 29 arms the main trigger circuit 39. The main trigger circuit 39 is thus conditioned to respond to the input signal appearing at terminal 20 for applying to the main sweep generator 21 a trigger 100 which is thus generated in synchronism with the input signal at terminal 20. Main sweep generator 21 produces a sweep signal 86 which is applied to one input of voltage comparator 25, the other input of which receives a reference signal, say ground. When both inputs to comparator 25 are equal, comparator 25 produces a trigger 87 which is applied to one input of coincidence circuit 32. The other input to coincidence circuit 32 is the trigger 89 previously described and the circuit operates to produce the intensified spot 93 in the manner as previously described. However, in this mode of operation, the intensified spot 93 identifies the event in the displayed input signal waveform that the main trigger circuit 39 is synchronized to. Thus, a particular event of many events displayed on a slow time scale may be selected by varying reference voltage source 31, which, through voltage comparator 29 and arming sweep generator 6, controls the time at which the main trigger circuit 39 is armed.

Also, since the main trigger circuit 39 is armed just before the arrival of the selected event in the signal appearing at input terminal 20, the recurrence of the selected event triggers the main sweep generator 21 in synchronism with the selected event. Thus, the intensified spot 93 is caused to jump from one event to the next on the input signal waveform displayed in this operating mode as the reference voltage source 31 is varied to select an event in the displayed waveform.

*Delayed main sweep triggered mode of operation*

Operation in this mode is as shown in FIGURE 4 and is selected by setting switch 7 to position B and by setting switch 41 to position C. The delaying sweep generator 9 and the arming sweep generator 6 are triggered in this mode as discussed above in connection with the delaying sweep mode of operation. However, delaying sweep generator 9 is not utilized in this mode of operation. The arming sweep generator 6 applies a sweep signal 80 to one input of voltage comparator 29, the other input of which receives a reference voltage 81 from reference voltage source 31. Comparator 29 produces a trigger output 84 when the voltage level of the signal at the output of the arming sweep generator 6 is equal to the level of the reference voltage 81. This corresponds to a particular delay time between the start of the arming sweep generator 6 and the event on the input signal waveform selected during the delaying mode of operation. The trigger output 84 from comparator 29 immediately starts the main sweep generator 21 which then applies the main sweep 86 to one input of voltage comparator 25. The other input of comparator 25 receives a scanning signal 75, normally a staircase waveform, from the scanner 19. When the voltage levels of these two signals are equal, the voltage comparator 25 triggers sampler trigger generator 26 which then triggers the sampler 27. Sampler 27 thus produces a sample pulse indicative of the instantaneous amplitude of the signal applied thereto through the delay line 8 from the input terminal 20 in the manner as previously described in connection with the delaying sweep mode of operation. These sample pulses are applied to the vertical deflection plates of CRT 11 through the vertical deflection amplifier 28 for display on the screen of CRT 11. The main sweep generator 21 generates a fast sweep 86 that thus provides the time scale of the display on CRT 11. This fast or expanded sweep is synchronized to the trigger 84 from voltage comparator 29 where this trigger 84 is synchronized to the signal appearing at input terminal 20 by the delaying trigger circuit 13 and arming sweep generator 6, as previously described. However, the trigger 84 from voltage comparator 29 is delayed in time from the start of the delaying arming sweep 72 (80) by the value of the voltage from reference voltage source 31. Thus, the selected portion of the input signal, primarily discussed in connection with the delaying sweep triggered mode of operation, is displayed on CRT 11 and any rate jitter in the input signal will be displayed in this operation mode and may be measured precisely on a fast time scale. Further, any portion of the input signal corresponding to the time represented by the fast sweep and contained within the time represented by the slower sweep may be observed in detail by varying the voltage from reference voltage source 31.

*Main delayed-armed mode of operation*

Operation in this mode is as shown in FIGURES 5 and 1 and is selected by setting switch 7 to position B and by setting switch 41 to position D. Operation in this mode is similar to the main delayed-triggered mode withe exception that the trigger 84 from voltage comparator 29 arms the main trigger circuit 39 so that the selected event of the input signal subsequently applied to the main trigger circuit input 43 causes the main trigger circuit 39 to produce a trigger 100. This trigger initiates the main sweep 86 from generator 21 and thus synchronizes the fast time scale to the event in the input waveform which was selected in the delaying sweep-armed mode of operation. The fast sweep 86 from the main sweep generator 21 is applied to one input of comparator 25 and a scanning signal 75 from scanner 19 is applied to the other input of voltage comparator 25. The output 87 of comparator 25 triggers sampler 27 through sampler trigger generator 26 and the sampled input signal is displayed on CRT 11 in a manner as previously described. Hence, the aforementioned selected event identified by the intensified spot is displayed on CRT 11 on a fast or expanded time scale. Further, since the fast or expanded sweep is synchronized to the displayed selected event rather than to the start of the delayed interval determined by delaying trigger circuit 13, any rate jitter associated with the input signal appearing at terminal 20 will not be displayed on the fast or expanded time scale.

In general, then, the sequence of events for the delayed main sweep mode of operation are as follows: the slow or delaying sweep generator 9 and arming sweep 6 are initiated by the input signal waveform. A delay interval is determined by the reference level from source 31. At the end of the delay interval either the faster sweep from the main sweep generator 21 is initiated or trigger circuit 39 is armed. Once the fast sweep has been initiated, it will rise until its level is equal to the staircase waveform provided by scanner 19. At this time one sample is taken. The instantaneous amplitude of the input signal at the time that the sample is taken provides the vertical information for the position of the sample as displayed on the CRT. The horizontal position of the sample on the CRT is provided by the staircase waveform from scanner 19 which drives the horizontal deflection electrodes of the CRT 11.

The whole sequence of events is repeated for the next sample and, in this fashion, a replica of the input signal waveform is constructed on the CRT display. When the signal has been reconstructed across the CRT, the staircase signal is reset and the whole sequence of events is repeated so that the reconstructed input signal is repetitively displayed on the CRT 11.

Thus, any event in the waveform of the input signal selected in the delaying mode may be observed in detail on a fast or expanded time scale and, because the fast sweep is synchronized in the armed mode to the displayed event, any rate jitter in the input signal is eliminated when displayed in the main delayed mode of operation.

We claim:
1. A signal circuit comprising:
    first generator means for producing a first signal of time-varying amplitude in response to application of an initiating signal thereto;
    a first source of comparison signal;
    first comparator means connected to said first source and to said first generator means for producing a first output in response to the signals applied to the first comparator means attaining a predetermined relationship to each other;
    second generator means for producing a second signal of time-varying amplitude in response to a trigger signal applied thereto;
    third generator means for producing a third signal of time-varying amplitude in response to a trigger signal applied thereto;
    means connected to receive the recurring applied signal for applying trigger signals to at least one of said second and third generator means;
    second and third sources of comparison signal;
    second comparator means connected to said second source and to said second generator means for producing a second output in response to the signals applied thereto attaining a predetermined relationship to each other;
    third comparator means connected to said third source and to said third generator means for producing a third output in response to the signals applied thereto attaining a predetermined relationship to each other;
    means connected to said second comparator means for applying said second output to said first generator means for operating the same to produce said first signal of time-varying amplitude; and
    utilization means connected to receive a recurring applied signal and being responsive to a selected one of said first and third outputs for producing an output signal related to the amplitude of the applied signal at the time of occurrence of said selected one of the first and third outputs.
2. A signal circuit as in claim 1 wherein:
    the comparison signal from the second source is a unidirectional signal of selected amplitude;
    the comparison signal from the first and third sources that is supplied to the respective one of the first and third comparator means which produces said selected one of the first and third outputs is a scanning signal having an amplitude which varies with time.
3. A signal circuit as in claim 2 wherein:
    the scanning signal is a staircase waveform which changes amplitude by a fixed value for each occurrence of said selected one of the first and third outputs.
4. A signal circuit as in claim 2 wherein:
    the second generator means produces the second signal as a substantially linear ramp of predetermined slope in response to a selected event in the recurring applied signal; and
    said first generator means produces the first signal as a substantially linear ramp having a slope greater than said predetermined slope in response at least to said second output.
5. A signal circuit as in claim 2 wherein:
    the utilization means includes a signal sampler;
    means connected to said utilization means for applying said selected one of the first and third outputs thereto to produce a sample pulse of the applied signal at each occurrence of said selected one of the first and third outputs, and comprising cathode-ray display means having deflection apparatus for displaying signals applied thereto along coordinate deflection axes;
    means connected to said display means for applying the scanning signal thereto for deflecting signal displayed thereby along one axis; and
    means connected to said display means for applying the sample pulses thereto for deflecting signal displayed thereby along another axis.
6. A signal circuit as in claim 5 wherein:
    said display means includes a display intensity control electrode;
    a coincidence circuit is provided for producing an output only in response to a pair of signals applied thereto attaining a predetermined time-sequence relationship;
    said third comparator means is connected to receive said scanning signal and to said third signal from the third generator means for producing said third output in response to the signals applied thereto attaining a predetermined relationship to each other;

means connected to said coincidence circuit for applying signals thereto representative of said first and third outputs; and means connected to said intensity control electrode for applying thereto the output of the said coincidence circuit to alter the intensity of the displayed signal at a selected location along a deflection axis.

7. A signal circuit as in claim 6 wherein:

said coincidence circuit receives said signals representative of said first and third outputs only when said utilization circuit is connected to be responsive to said third output from the third comparator means;

said third comparator means is connected to receive said scanning signal; and said first comparator means is connected to receive a reference potential from said first source of comparison signal.

References Cited

UNITED STATES PATENTS 2,951,181   8/1960   Sugarman.
3,010,070   11/1961   Siegel _____ 328—147 X
3,383,548   5/1968   Goodale _____ 315—25

RODNEY D. BENNETT, *Primary Examiner.*

T. H. TUBBESING, *Assistant Examiner.*

U.S. Cl. X.R.

315—25; 328—147, 148, 151